United States Patent [19]

Delahanty

[11] Patent Number: 4,469,260
[45] Date of Patent: Sep. 4, 1984

[54] CONVERSION OF ROOF TOP SURFBOARD CARRIERS TO IMPROVED SKI CARRIERS

[76] Inventor: Dennis M. Delahanty, 219 Forest Ave., Pacific Grove, Calif. 93950

[21] Appl. No.: 406,083

[22] Filed: Aug. 6, 1982

Related U.S. Application Data

[63] Continuation-in-part of Ser. No. 239,384, Mar. 2, 1981, abandoned.

[51] Int. Cl.³ .......................... B60R 9/04; B60R 9/12
[52] U.S. Cl. .................................. 224/315; 224/319; 224/324; 224/917
[58] Field of Search ............... 224/315, 319, 321, 322, 224/323, 324, 325, 329, 917, 309; 248/205.1

[56] References Cited

U.S. PATENT DOCUMENTS

| | | | |
|---|---|---|---|
| 2,575,458 | 11/1951 | Merrill | 224/323 |
| 2,772,824 | 12/1956 | Binding | 224/319 |
| 3,239,115 | 3/1966 | Bott et al. | 224/917 X |
| 3,512,689 | 5/1970 | Metropoulos | 224/917 X |
| 3,638,844 | 2/1972 | Bronson | 224/323 X |
| 3,737,083 | 6/1973 | Lund | 224/324 X |
| 3,986,693 | 10/1976 | Johnson | 248/205.1 |

FOREIGN PATENT DOCUMENTS

| | | | |
|---|---|---|---|
| 1086141 | 7/1960 | Fed. Rep. of Germany | 224/325 |
| 1142611 | 9/1957 | France | 224/325 |
| 100412 | 12/1940 | Sweden | 224/324 |

Primary Examiner—Allan N. Shoap
Attorney, Agent, or Firm—Van W. Smart

[57] ABSTRACT

Apparatus for converting automobile roof top surfboard carriers of the type that has a pair of roof spans in parallel relationship fastened in the rain gutters, into ski carriers. A conversion unit having a metal tube with crimped ends, with several apertures for pin mechanisms in those ends, is bolted to each roof span. The metal tube has a U-bolt fastened at its center. A strip of hot rolled mild steel is slideably attached to each leg of the U-bolt. The strip of steel has a plate depending from one end. There are several apertures for pin mechanisms in the plate. The strip of mild steel has lengthwise shallow bow which is about one and a half inches deep at its maximum depth. Between the plate and the U-bolt aperture, a strip of high density rubber depends from the bow. The operator spreads the skis over the metal tubes of the roof spans and under the bowed strip of steel. He presses down upon the plate. The bows flatten over the skis. They become partially embedded in rubber. The bowed steel strip moves up its leg of the U-bolt and jams to a halt. The operator slides padlock shackle or a pin mechanism through the apertures in the crimp and in the plate, whereupon the skis are clamped upon the roof spans and remain so until the operator removes the padlock or pin mechanism.

3 Claims, 21 Drawing Figures

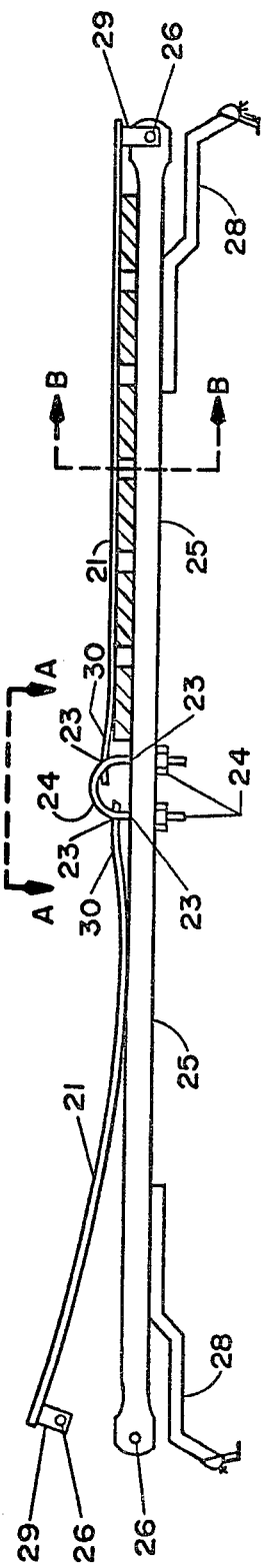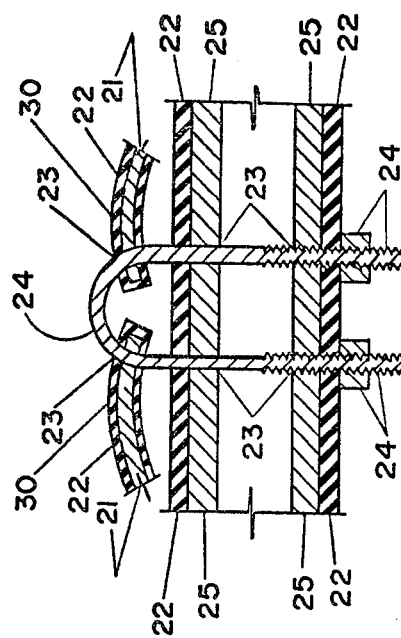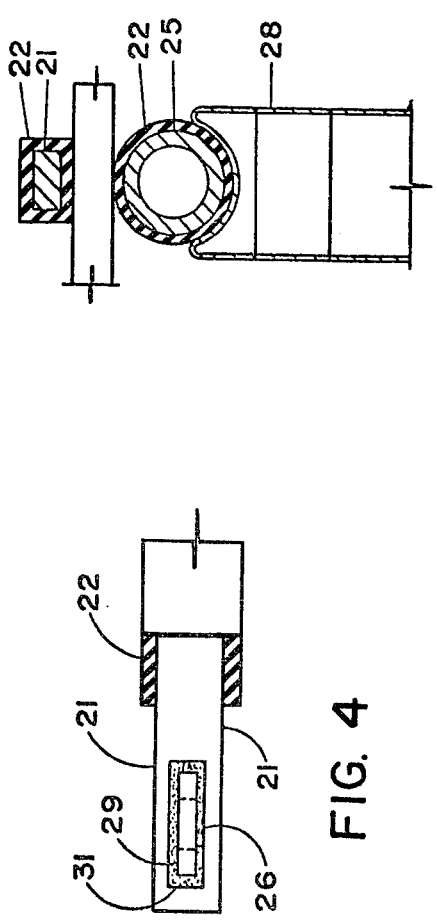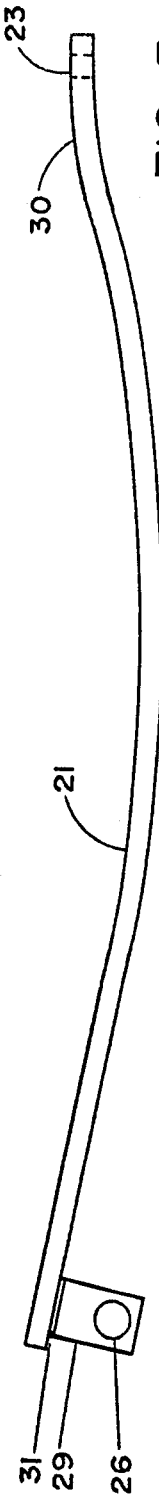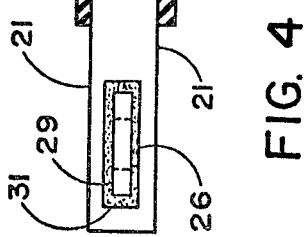

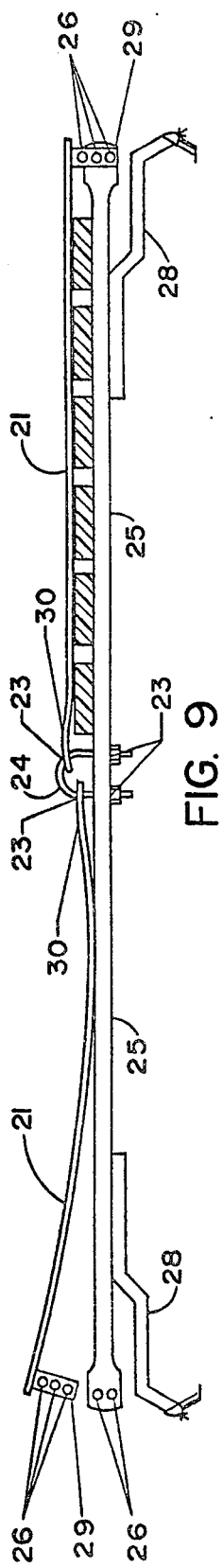
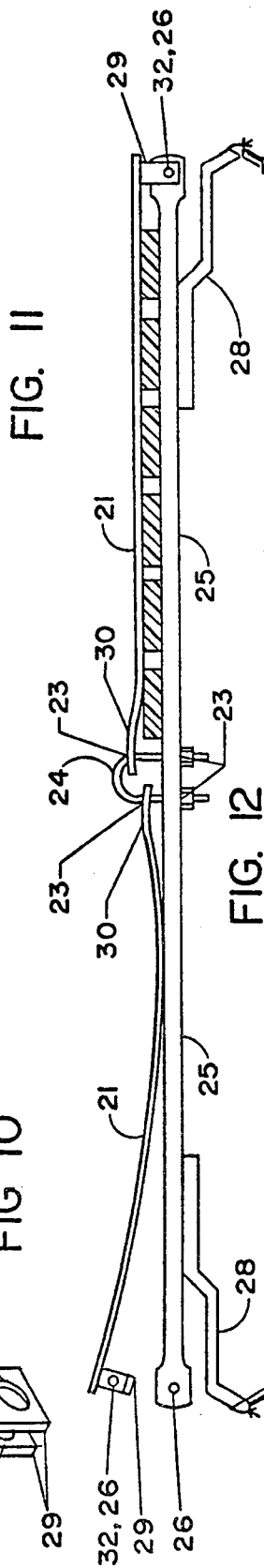
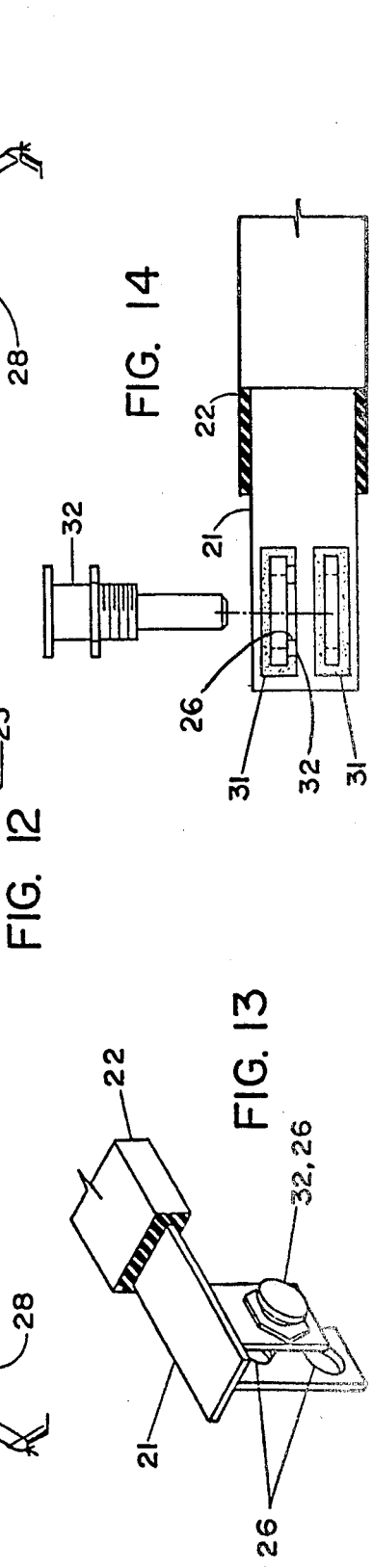

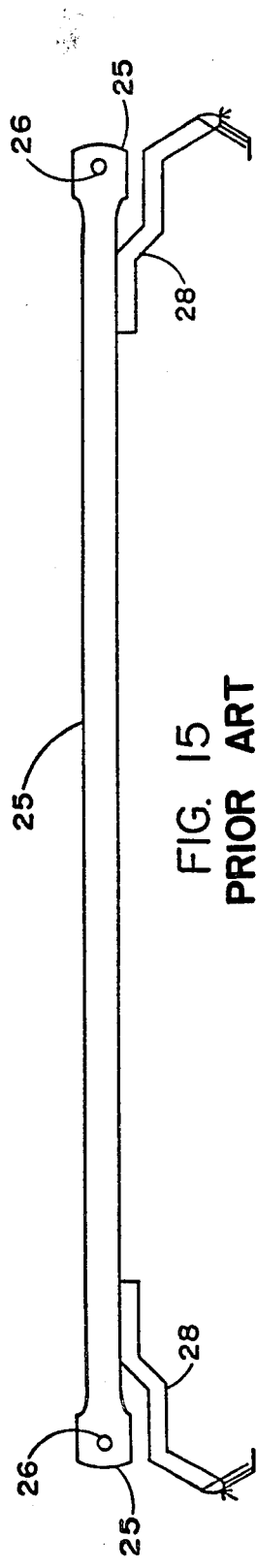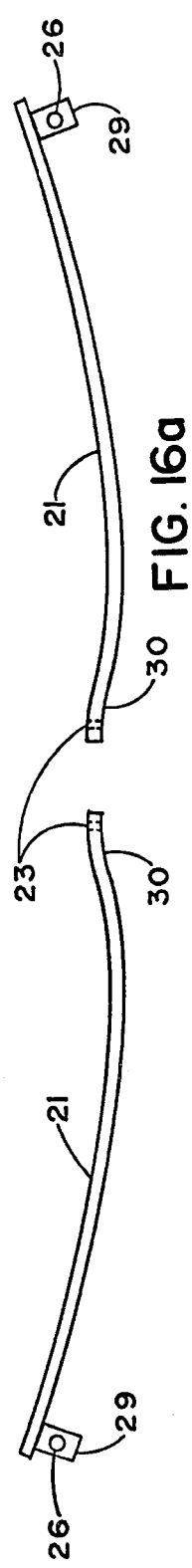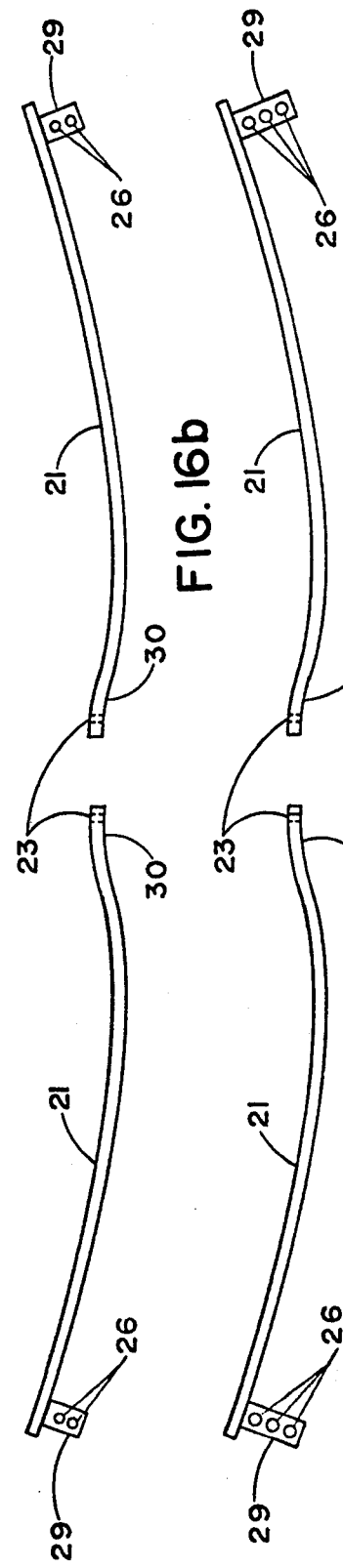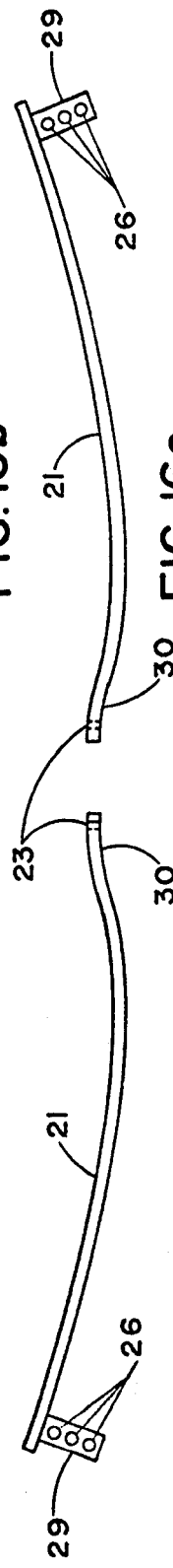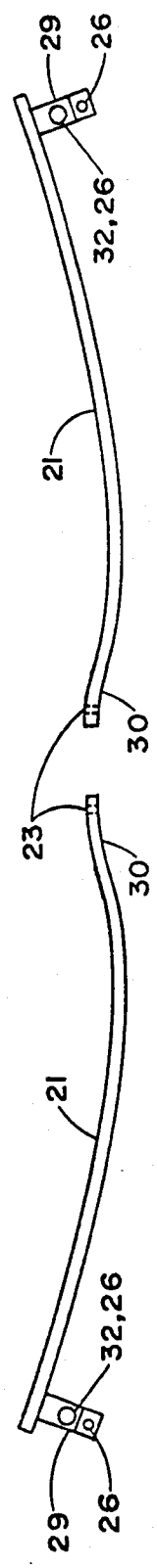

CONVERSION OF ROOF TOP SURFBOARD CARRIERS TO IMPROVED SKI CARRIERS

This application is a continuation-in-part of the parent application, Ser. No. 239,384, filed Mar. 2, 1981, and now abandoned.

BACKGROUND OF THE INVENTION (1) Field of the Invention

This invention relates generally to improved automobile roof top carriers for snow and water skis and more particularly to apparatus for converting prior art automobile surfboard carriers to improved snow and water ski carriers.

(2) Description of the Prior Art

Until the time of this invention sports persons seriously interested in both surfboarding and skiing had to have one automobile roof top carrier for surfboards and another for skis. This increased equipment cost and storage problems.

There are a number of prior art ski carriers in Class 224 of the patent classification. Class 224 pertains to package and article carriers. The prior art ski carriers consisted of a pair of roof spans, placed parallel to each other. The roof spans were fastened into the rain gutters, sometimes known as the drip mold. Clamping means were added on the roof span to bind the skis to the roof spans. The skis were bound under strips of rubber to prevent their becoming marred.

SUMMARY OF THE INVENTION

Among the inventory of parts for constructing an improved automobile roof top carrier for skis are a pair of roof top spans, four bowed adapter bars, two metal tubes with narrowed (crimped ends), two U-bolts, and four padlocks.

Each bowed adapter bar has a plate welded, or may have parallel plates welded on one end of the bow and a U-bolt aperture in the other end. There are from one to three padlock apertures in a plate or through parallel plates for a padlock shackle. the bow starts near the U-bolt aperture and continues past the plate. The bowed adapter bar is made of a special hot rolled mild steel. One of the apertures in a parallel plate may be sized for a spring return pin. The hot rolled mild steel accords to Specification M-1020 of the Kirby Low Iron Works, Monterey, Calif.

Both metal tubes are the ordinary article of commerce, made of steel thick enough that they do not deform under the pressures applied. The tubes are about as long as the automobile roof is wide. Both ends are narrowed by application of pressure until their cross sections become elliptical with the long axis of much greater length than that of the short axis. The ends can be called crimped. Apertures are made at the centers of the tubes to fasten common U-bolts.

The inventory of parts include common nuts and bolts to fasten the the metal tubes to the top of the roof span.

When a pair of bowed adapter bars are attached to to the U-bolt, one to right leg, the other to the left leg, and the U-bolt is centrally attached to the combination of the roof span and the metal tube with narrowed or crimped ends, with padlock apertures in those ends; there are two vises on the roof span. Each of the vises have a moving jaw and a fixed jaw. One vise is the right hand vise and the other the left hand vise. The bowed adapter bar attached to the right U-bolt leg and the portion of the metal tube laying under it are the moveable and fixed jaws respectively of the right hand vise.

When two roof spans are placed in parallel position over the width of the automobile roof top and each roof span has the attachments of the above paragraph; skis are ready to be loaded. All of the plate ends of the bowed adapter bars are separated from the metal tubes. Skis are placed over the metal tube and under the plate ends on the roof span over the back roof span. When the roof spans are loaded in the manner desired, each ski will lay on a front and back roof span. The operator walks down one side of the automobile and depresses the plate ends of the bowed adapter bars until each ski is substantially embedded in the rubber block. When it is so embedded, he manipulates the pressure on the plate end until an aperture in the plate matches with an aperture in the crimped end of the metal tube and the bowed adapter bar has come to rest on its leg of the U-bolt. Then he puts a padlock shackle through the matched apertures. This immobilizes and locks the parts. The force generated by the operater is distributed through the parts. The parts are in equilibrium. There is no further movement of any part until the padlock is removed.

The operator walks up the other side of the automobile and repeats matching apertures in the plates of the bowed adapter bars with those in the crimped ends of the metal tube. All skis are, at the conclusion, held steady over the two roof spans of the automobile. They can be released by removing the padlocks or pinning means.

The combination of a U-bolt, a metal tube and a pair of bowed adapter bars is half of a kit for for converting a prior art automobile roof top surfboard carrier to an improved automobile roof top ski carrier. The metal tube has crimped ends and one or more apertures for padlocks or pins in those crimps. The bowed adapter bars have a plate, or parallel plates with a number of apertures in the plates and a terminal aperture on the other end of the bar. The terminal apertures of the adapter bars are mounted, one to each leg of the U-bolt.

The prior art automobile roof top surfboard carrier is essentially a pair of roof spans fastened into the rain gutters. Conversion is simple and occurs when the U-bolt of the conversion kit is bolted into the two prior art roof spans.

One of the objectives of this invention is to provide a bowed adapter with spring-like characteristics to be placed on prior art automobile roof top surfboard carriers of the type having a pair of parallel roof spans fastened into the rain gutters of the automobile body; to convert the prior art surfboard carriers into improved ski carriers.

Another objective of this invention is to provide bowed adapter bars that will permit a converted prior art automobile roof top surfboard carrier to be reconverted to its originial construction.

Another objective of this invention is to provide a bowed adapter bar that will return to its original "bow" when the padlock is removed. In other words, the operator's hand pressure on the plate end of the bowed adapter bar that is required to line up the desired apertures in the plate and the apertures in the crimped end of the metal tube and the length of time that the system is under tension will not permanently change the dimensions of the adapter bar or the shape of the metal tube.

Still another object is to provide a bowed adapter bar that will not permanently change its dimensions in the rest state after repeated use. It would be more difficult to line up padlock shackle apertures in the plate with those in the crimped ends of the metal tube if the length of the bowed adapter bar were to permanently and materially increase after repeated use. After experimentation with steel composition, I found the Kirby Lowe Iron Work's of Monterey, Calif., hot rolled mild steel, Specification M-1020, was satisfactory. Other steel firms have somewhat similar compositions of steel that may be used. I used strips of this Kirby Lowe hot rolled mild steel that were about an eighth of an inch thick, three quarters of an inch wide, and about twenty four inches long. The strips were bent to fit a jig. The "bow" of the bowed adapter bar is about an inch and a half deep at its maximum measured from an imaginary straight line along the tops of both ends. A U-bolt leg aperture is drilled close to one end of the bar. Shortly past the U-Bolt aperture, the bending of the bowed adapter bar commences and is completed at the twenty four inch length. The place where the bending of the "bow" starts is illustrated at 30 in the drawing. The bow is not symmetrical if folded on itself at its center. If the bow were divided into a large number of equal segments, there would be no noticable discontinuity from segment to segment, except at the very start of the "bow". Because of this lack of discontinuity, geometers would call it a "regular" bow. A plate or parallel plates are welded under the end of the bow. From one to three apertures are drilled in the plates or through parallel plates. These apertures are for "pinning means" to lock the pressure generated by the operator's hand on the plate end of the bowed adapter bar, to clamp skis on the roof top spans. Pinning means include padlocks, clevis pins, cotter pins, spring return pins and, nuts and bolts. Pinning means through selected apertures in the plate of the bowed adapter bar and through selected apertures in the crimped end of the metal tube flattens the bow upon the skis. If parallel plates are used, the aperture in the plate nearest to the (cont. page 4) weld may be drilled for a spring return pin. Its opposing aperture would be sized to the pin. Under the opposing aperture is a padlock aperture, so that the skis may be under lock and key if the spring return pin isused. Safety from theft does not have to be sacrificed for the convenience of using a spring return pin.

An important objective is to make the conversion kit more attractive and to protect it from corrosion. The metal parts of the kit are coated with, painted with, sprayed with, vinyl resins or polymer plastics.

Another important objective of the invention is to protect the skis from becoming marred in clamping and in transportation. Strips or blocks of high density rubber such as wet suits are made are cemented on the bowed adapter bars to lay upon the skis to be clamped.

An important objective of the invention is to provide U-bolts, the diameters of whose legs are such that in relation to the diameters of the U-bolt apertures in the bowed adapter bars, the bowed adapter bars will easily travel up or down the U-bolt leg until the operator has applied hand pressure to the plate end of the bowed adapter bar and has set pinning means through selected apertures in the plate and and the crimped end of the metal tube; whereupon the partial contact of the walls of the U-bolt aperture with the leg of the U-bolt freezes motion up or down the U-bolt leg until the pinning means are removed.

BRIEF DESCRIPTION OF THE DRAWING

FIG. 2 is a side view of a roof span of FIG. 1 showing the U-bolt 24, two adapter bars 21, attached one to each leg of the U-bolt. The adapter bar clamping skis is flattened over the skis. Its apertured end 23 is high on its U-bolt leg. The bar not clamping skis is bowed rather than flat and its apertured end 23 is lower on its leg of the the U-bolt. The pinning means aperture in the metal tube 25 is 26. FIG. 2a is a cross-section view taken along the line AA of FIG. 2. FIG. 2b is a cross-sectional view taken along the line BB of FIG. 2. These show protective coatings.

FIG. 3 is the left adapter bar detatched from FIG. 2 to show 30, the start of the bend of the bow of the adapter bar and 31 is the weld of the plate.

FIG. 4 is an enlargement of the plate end of FIG. 3 rotated to show the under side of the weld on the plate, also to show the rubber ski protection.

FIG. 9 is similiar to FIG. 2 except for the numbers of apertures for pinning means in the plate and in the metal tube.

FIG. 10 is an enlarged perspective of a segment of the adapter bar of FIG. 9 showing apertured parallel plates and rubber ski protection.

FIG. 11 is a rotation of FIG. 10.

FIG. 12 is a side view of the parallel plates on the adapter bars made to accommodate spring return pins 32 of FIG. 14.

FIG. 13 is a perspective of left end of FIG. 12 to show the attachment of the spring return pin 32.

FIG. 14 is a top view of a spring return pin with a centering line to show its positioning through the parallel plates of an adapter bar.

FIG. 15 is a prior art roof span, side view.

FIGS. 16a, 16b, and 16c are isolated pairs of one plate bowed adapter bars having respectively one, two, and three pinning means apertures in their plates. FIG. 16d is an isolated pair of bowed adapter bars having parallel plates. The forward plate is apertured in the top portion for a spring return pin. The rearward plate has two apertures. With this arrangement skis may be locked into the carrier by a non-key locking device, a spring return pin, or by a key locking device, a padlock.

DETAILED DESCRIPTION OF THE PREFERRED EMBODIMENT

Figure 1:
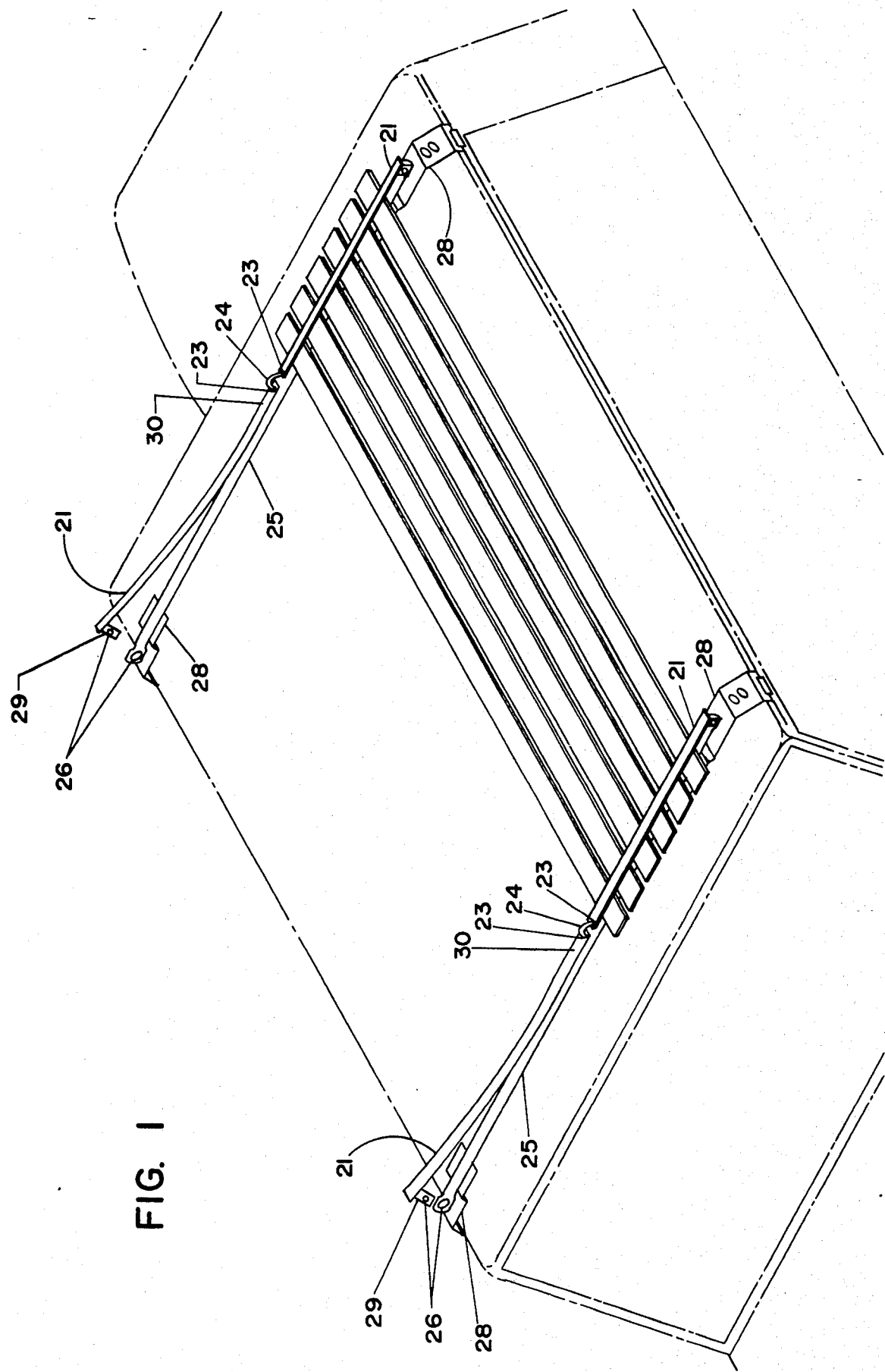
FIG. 1 is a perspective view of the present apparatus for conconversion of roof top surfboard carriers to improved ski carriers shown mounted on a pair of roof spans 28 anchored into the rain gutters of an automobile.

Other objects and many of the attendant advantages of the present invention will be readily appreciated as the same become better understood by reference to the following detailed description of embodiments considered in connection with the accompanying drawings in which like reference numerals designate like parts throughout the figures thereof.

FIG. 1 is a view in perspective of a conventional auto above its hood. It shows, without detail, the placement of the apparatus of this invention. The observer's view is facing the hood and looking to the rear of the auto. It shows six skis to the right of the U-bolts. The bowed adapter bars are flattened. No skis are clamped to the left of the U-bolts. The bows of the left adapter bars are not flattened. No detail is shown here or elsewhere in the drawing of the apparatus to fasten the roof spans into the rain gutters.

Figure 5:
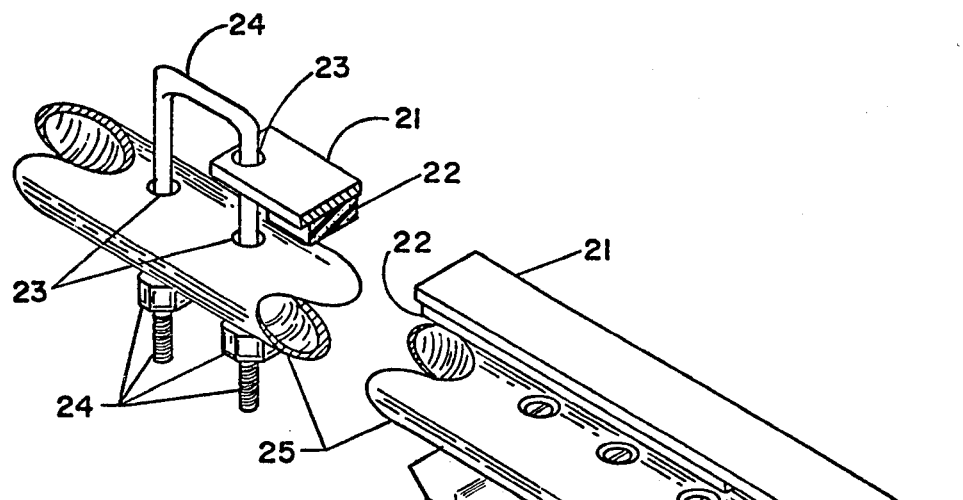
FIG. 5 is a large scale perspective drawing showing about half of the conversion apparatus for a roof span on half of a roof span. The components of the roof span are made of slideably fitting relatively short lengths of channel iron and larger 90 degree bends of channel iron. The channel iron is closely apertured on a center line. The metal tube 25 with crimped apertured ends and centrally attached U-bolt for attachment of adapter bars is also apertured at short intervals along the axis. The channel irons are tightened into the opposite rain gutters, the height of the shelf of the roof span is established, the apertures in the channel irons and the centrally placed metal tube are aligned and the assembly is bolted, metal tube to roof span into a rigid configuration for clamping skis. The padlock shackle 27 key locks the plate of the adapter bar to the metal tube through lined-up apertures in each. The adapter bar is slideably attached to a leg of the U-bolt, which U-bolt is bolted to the metal tube now bolted into the roof span.

Next FIGS. 2 and 5 should be considered together. FIG. 5 is a magnified drawing of about a half of a half of the invention. FIG. 2 illustrates about half of the apparatus of the invention. In other words, two units of FIG. 2 would be required because of the necessity of one end of a ski being placed on one roof span, and the other end on another roof span.

Figure 6:
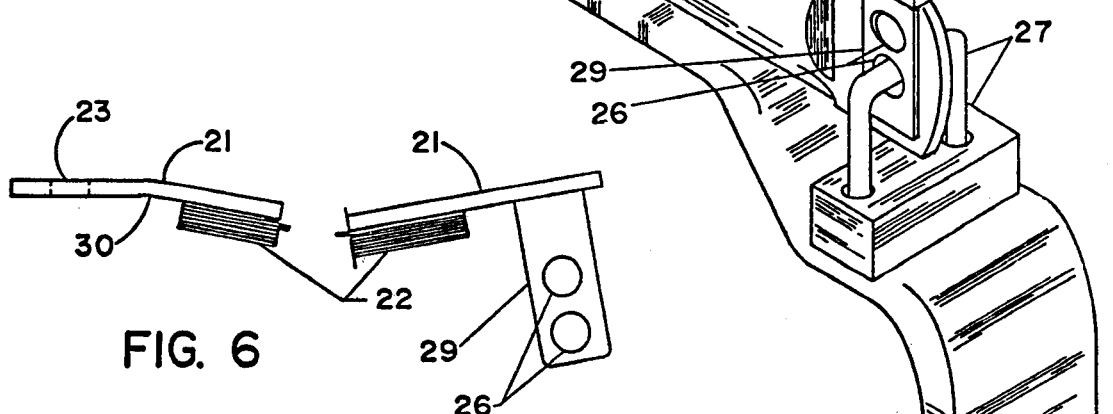
FIG. 6 is a side view of the adapter bar of FIG. 5.

Prior art roof spans for automobile surfboard carriers had many different constructions but a common construction may be seen from FIG. 5 of the drawing. They were made from slideable fitting apertured channel irons. The legs of the prior art roof span are short channel irons, an end of which is fastened into the rain gutter, the opposite end was slideably fitted into a 90 degree angle channel iron. Two such fittings were joined by a slideable fitting straight section of apertured channel iron. The result after the channel irons were fitted over the width of the automobile roof and bolted through the apertures, was a U shaped roof span anchored to the rain gutter, having a shelf upon which articles to be transported would lay and clear the automobile roof. FIG. 5 shows the straight section of the angle iron removed and the cut metal tube with the crimped and apertured ends 25 bolted to the to the channel irons 28 of the roof span. FIG. 5 shows one end of the bowed adapter bar 21 fastened to U-bolt leg 24 through its U-bolt aperture 23. FIG. 5 shows the shackle of padlock 27 through one of the two apertures 26 in plate 29. FIG. 5 shows a strip of high density rubber 22 between the bowed adapter bar 21 and the metal tube with crimped ends 25. In FIG. 5 the bowed adapter bar is not shown clamped over skis. Instead it is clamped over the metal tube 25. Consequently the bowed adapter bar in FIG. 5 is flattened upon the metal tube 25. Also, the bowed adapter bar is shown in a cutaway section near its U-bolt aperture 23, the place at which the "bow" of the bowed adapter bar starts is not shown. It is, however, shown in FIG. 6. FIG. 6 shows the bowed adapter bar cutaway and the bow does not, therefore, show.

FIG. 2 is a side view of one half of a conversion kit on a prior art automobile roof top surfboard carrier. Plane A-A is a section plane going in a North-South direction through the U-bolt. B-B is a cutting plane in a West-East direction looking from the center of the auto to the rain gutter. These section planes show protective coatings on metal parts and high density rubber 22 to protect the skis from becoming marred. Parts 28 are all that remain of the prior art automobile roof top surfboard carrier. Metal tube 25 is attached to 28 with common nuts and bolts. These are shown without number identification in the metal tube 25 in FIG. 5. FIG. 4 is a rotation of the plate end of FIG. 2 to show the weld. The right side of FIG. 2 from the center of the U-bolt to the end of the crimped end of the metal tube 25 shows the bowed adapter bar flattened on the six skis being held. A padlock or other pinning means should be shown through the apertures 26, one aperture 26 being in the plate and the other aperture 26 being in the crimp end of metal tube 25. The aperture in the plate 29 is shown. The corresponding aperture 26 in the crimped end of 25 is not shown as it is hidden by the plate of the bowed adapter bar. It would unnecessarily crowd FIG. 2 to put a padlock or pining means in the FIG. 2. The missing detail can be supplied by a word description and reference to FIG. 5. There is no place to illustrate 30, the place where the "bow" commences in FIG. 5, but there is a place, in fact two places to show it in FIG. 2, on each bowed adapter bar, a short distance from each leg of the U-bolt. FIG. 2 shows the result of an important function. On the right side of FIG. 2 where the skis are locked, the bowed adapter bar rests high upon its leg of the U-bolt. On the left side of FIG. 2 where no skis are held, the bowed adapter bar rests low on its leg of the U-bolt.

FIG. 3 is a side view of a bowed adapter bar, the embodiment of this invention that has a single plate with one aperture within the plate. It shows the U-bolt aperture at the end of the bowed adapter bar. It also shows 30, the place on the bowed adapter bar 21 where the "bow" starts. At 31 of FIG. 3, the weld that joins plate 29 to the bowed adapter bar is shown.

FIG. 6 is the side view of the bowed adapter bar of FIG. 5. It is not in perspective as it is in FIG. 5. It is shown without relation to the U-bolt 24, the padlock 27, or the metal tube with apertured crimped end, part 25 of FIG. 5. Because a considerable part of the bowed adapter bar is cut out, FIG. 6 does not show the bow. However, FIG. 6 shows the start of the "bow" at 30. FIG. 6 shows 22 the high density rubber ski ski protection strip.

Figure 7:
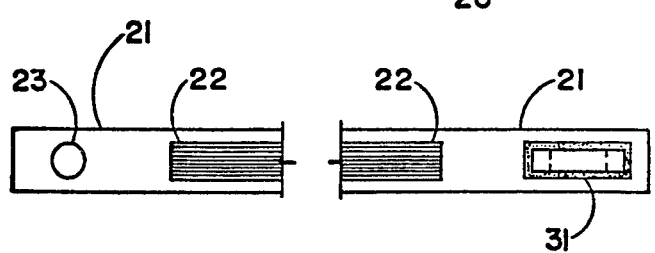
FIG. 7 is a rotation of FIG. 6.

FIG. 7 is a top view of a rotation of FIG. 6 to show the weld 31 of the plate 29.

Figure 8:
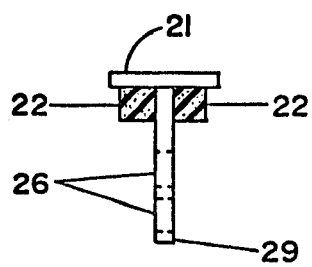
FIG. 8 is an end view from the plate of FIG. 6.

FIG. 8 is an end view of the T structure of a single plate 29 with two apertures within the plate. Joined to the bowed adapter bar is 22, a strip of high density rubber, positioned back of the plate for marr protection of the skis.

FIG. 9 is similar to FIG. 2 except FIG. 9 shows the embodiment of this invention where there are three apertures 26 in the plates and two apertures in the crimped ends of metal tubes 25.

FIG. 10 is a perspective of the end of a bowed adapter bar with parallel plates 29, with three apertures 26 drilled on a line through those parallel plates for pinning means. Three apertures 26 in the plates give the operator a wider choice for the force that the bowed adapter bars exert upon locked skis.

FIG. 12 is also similiar to FIG. 2. It shows parallel plates on the bowed adapter bar.

FIG. 13 is an enlarged perspective of the parallel plates on the bowed adapter bar in FIG. 12. Part 32 in FIGS. 13 and 14 is a spring return pin. The spring return pin is attached to the short plate of FIG. 13 by hex nuts on each side of the plate. About the bottom half of 32 is the visible part of the pin of the spring return pin. The remainder of the pin is hidden from view within the tube of the spring return pin. The hex nut threads are shown on the tube. The hidden part of the pin of the spring return pin and the entire spring is within the tube of the spring return pin. The pin part of the mechanism is attached to the circular knob at the very top of 32 in FIG. 14. When the operator lifts up on the circular knob, the spring compresses, the pin engaged in its aperture on the long plate withdraws from its aperture in the long plate. When the operator lets loose of the circular knob, the hidden spring relaxes and the pin re-engages in its aperture in the long plate. Spring return pins are old in the art. The spring return pin is a convenience when arranging a load on the roof top ski carrier. When the load is not under observation, the operator protects his skis from theft by locking with a padlock with its shackle through the lower aperture in the long plate of FIG. 13 and the aperture on the crimped end of the metal tube 25 in FIG. 12.

No claim is being made for the spring return pin. It is used in this invention as one of the several means for pinning forces applied.

FIG. 15 is a single roof span of a prior art automobile roof span surfboard carrier. FIG. 15 is the structure made by removing the U-bolt and the bowed adapter bars attached to each leg of the U-bolt, from FIGS. 2 and 12. When two structures of FIG. 15 are fastened parallel to each other width-wise over an automobile roof top, surfboards may be bound on the spans with rope, cord, elastic bands and various tie-downs of other types.

FIGS. 16a–16d show various embodiments of the bowed adapter element of this invention without connection to U-bolts in tiers from top to bottom, illustrating the embodiment with a single aperture in the plate, a pair of apertures in the plate, three apertures in the plate, and at the very bottom of the tier, the embodiment for a spring return pin. This spring return pin embodiment has an aperture for locking the skis with a padlock. when the lower aperture in the plate is lined up with a particular aperture in the crimp in the metal tube, the greatest clamping power is being used.

I claim:

1. A carrier for placement on the roof of an automobile, said carrier comprising:

a tubular body for supporting at least a portion of an article to be carried on said carrier, said body having its ends flattened to present at each end a flange-like projection extending outwardly in the longitudinal direction of said body and being substantially the same height as said body, each projection having an aperture therethrough, said body having means for securement thereof at respective sides of the automobile, said body having a substantially U-shaped bolt for removably securing at generally the middle of the length of said tube, a resilient metal bar strip for releasable pivotable attachment to said body whereby skis or the like may be clamped between said body and said strip, said strip being generally less than half the length of said body and having an aperture at one end for passage therethrough of a leg of said U-bolt, said strip at the opposite end thereof having two generally parallel, spaced flange plates generally perpendicular to said strip and extending downwardly for placement of one of said projections therebetween when said strip is clamped to said body, said flange plates having apertures therethrough for alignment with said aperture through said projection for passage of a pin means for securing said projection and said flange plates together thereby clamping said strip to said body, said strip in a relaxed, unclamped condition being curved such that said strip between the ends thereof bows in the same downward direction as said flange plates.

2. The carrier of claim 1, further including a second resilient metal bar for connecting to the other leg of said U-bolt and clamping to the other end of said body.

3. A resilient metal bar strip for releasable pivotable securement to a car top carrier of the type having a tubular body for traversing the width of the roof of an automobile, said strip comprising:

a pair of generally parallel, spaced flange plates extending generally perpendicular to said strip at one end thereof, said flange plates having an aperture therethrough for passage of a locking pin means for securing an end of the car top carrier tubular body between the flange plates, said strip having a length generally less than half the length of the car top carrier tubular body, said strip having an aperture through its other end opposite said one end for attachment to near the center of the car top carrier tubular body, said strip being curved in a relaxed state with the bow of said carrier curve being concave when viewed from the side of said strip said flange plates extend, the major portion of said strip being defined within said curve except for a minor portion at said other end including the aperture therein, said curve and the attachment of said strip through said aperture at said other end to the car top carrier tubular body allowing said strip to pivot and clamp skis or the like between the car top carrier tubular body and said strip with said strip being substantially in a straight plane except for said minor portion when said flange plates are secured to the car top tubular body.

* * * * *